W. J. CASS.
CLIP FOR NECK YOKES.
APPLICATION FILED MAY 13, 1916.
1,224,708.
Patented May 1, 1917.
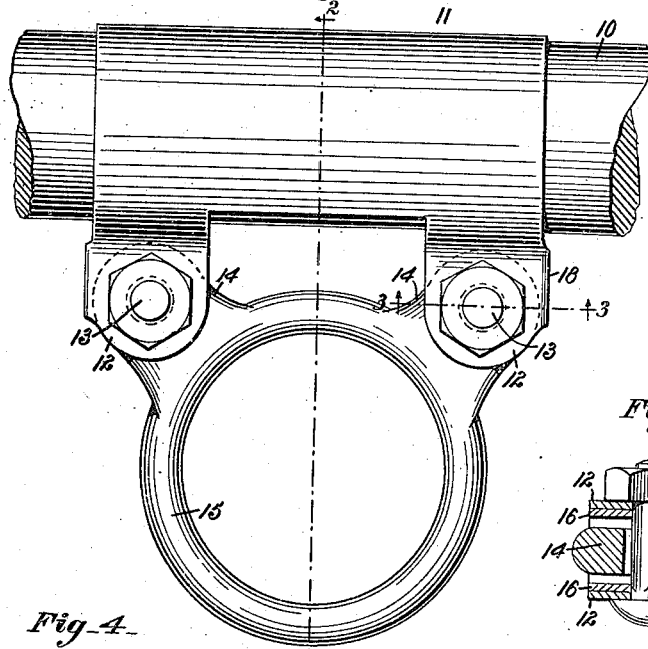
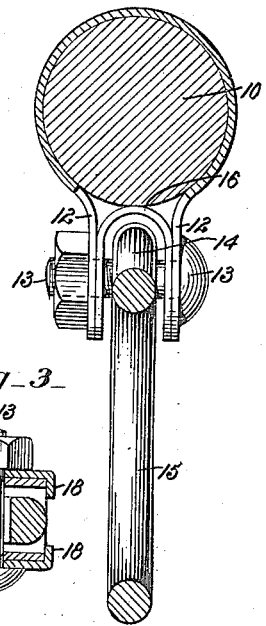
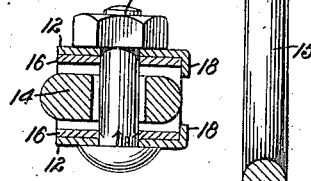
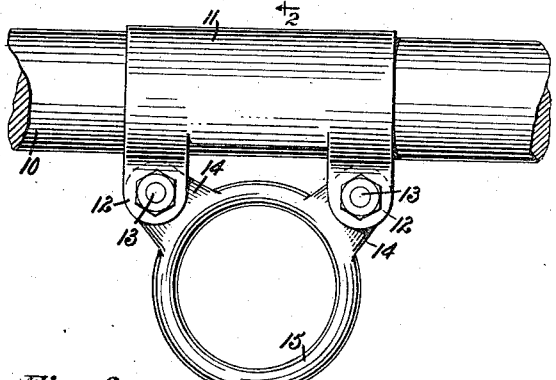
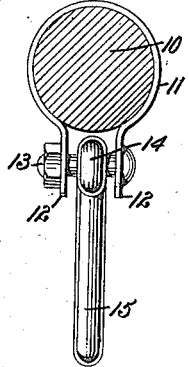
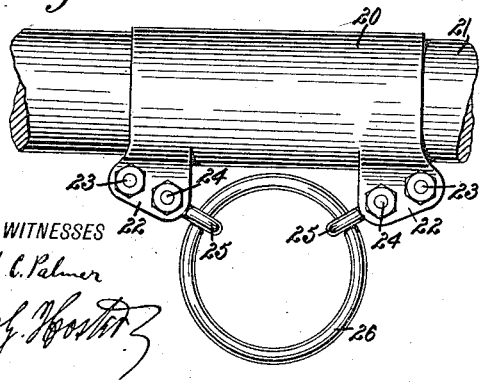
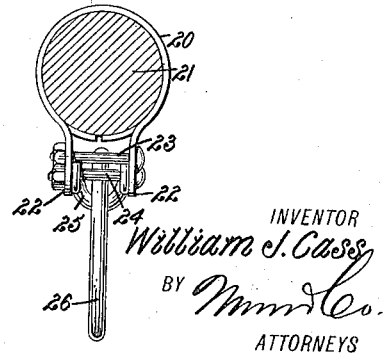
WITNESSES
Frank C. Palmer
INVENTOR
William J. Cass
BY
ATTORNEYS

UNITED STATES PATENT OFFICE.

WILLIAM JONES CASS, OF EASTON, MAINE.

CLIP FOR NECK-YOKES.

1,224,708.   Specification of Letters Patent.   Patented May 1, 1917.

Application filed May 13, 1916. Serial No. 97,293.

*To all whom it may concern:*

Be it known that I, WILLIAM JONES CASS, a subject of the King of Great Britain, and a resident of Easton, in the county of Aroostook and State of Maine, have invented a new and Improved Clip for Neck-Yokes, of which the following is a full, clear, and exact description.

The object of the invention is to provide a new and improved clip for neck yokes arranged to strengthen or reinforce the yoke bar, to permit of securely fastening the clip in position on the yoke bar without weakening the latter, to securely hold the pole ring in position, and to present no undesirable projection to the pole.

In order to accomplish the desired result, use is made of a tubular split clip adapted to fit around the yoke bar and provided at its ends with pairs of lugs, bolts extending through the said pairs of lugs, and a pole ring connected with the said bolts intermediate the lugs of the said pairs of lugs.

A practical embodiment of the invention is represented in the accompanying drawings forming a part of this specification, in which similar characters of reference indicate corresponding parts in all the views.

Figure 1 is a front view of the clip as applied;

Fig. 2 is a cross section of the same on the line 2—2 of Fig. 1;

Fig. 3 is a sectional plan view of the same on the line 3—3 of Fig. 1;

Fig. 4 is a front view of a modified form of the clip as applied;

Fig. 5 is an end view of the same with the yoke bar in section;

Fig. 6 is a front view of another modified form of the clip as applied; and

Fig. 7 is an end view of the same with the yoke bar shown in section.

On the yoke bar 10 fits a split tubular clip 11 provided at its ends with depending pairs of lugs 12 engaged by transversely extending bolts 13 to permit of tightly drawing the clip around the yoke bar 10 and thus securely holding the clip in place without passing the bolts through the yoke bar 10 and thus weakening the same. The bolts 13 are engaged intermediate the lugs of the pairs of lugs 12 by ears 14 extending integrally from the pole ring 15 so that the latter is supported on the bolts and presents no obstruction whatever to the pole passing through the pole ring 15. By reference to Fig. 1, it will be noticed that the ears 14 extending radially from the pole ring 15 diverge so that the pole ring 15 can be readily attached to the bolts 13 without the pole ring coming in contact with the yoke bar 10. By reference to Figs. 2 and 3 it will be noticed that the ears 14 are spaced from the lugs 12 and consequently the latter can be drawn toward each other by the bolts 13 to securely clamp the clip 11 in place on the yoke bar 10.

In order to reinforce the lugs 12, use is made of inverted U-shaped reinforcing members 16 held on the bolts 13 and extending between the corresponding pairs of lugs 12, as plainly indicated in Figs. 2 and 3. The reinforcing members 16 freely straddle the ears 14 and the sides of the reinforcing members 16 are free to yield on tightening the bolts 13, as previously explained. In order to hold the reinforcing members 16 against turning, the lugs 12 are provided along their outer edges with flanges 18 extending inwardly or toward each other and engaging the outer sides of the reinforcing members 16 to hold the latter against turning on the bolts 13.

In the modified form shown in Figs. 4 and 5, the reinforcing members 16 are dispensed with but otherwise the construction is the same as above explained relatively to Figs. 1, 2 and 3.

In the modified form shown in Fig. 6, the tubular split clip 20 fits around the yoke bar 21 and is provided with pairs of depending lugs 22, of which the lugs in each pair are connected with each other by two tightening bolts 23 and 24. The tightening bolts 23 and 24 support clevises or links 25 engaging the pole ring 26, thus connecting the latter with the clip 20.

The clip for the neck yoke shown and described is very simple and durable in construction and can be readily applied to the yoke bar and securely fastened to the same without weakening the pole bar, and the several parts can be readily assembled or disassembled in case one of the parts is worn out or otherwise injured.

Having thus described my invention, I claim as new and desire to secure by Letters Patent:—

1. A neck yoke fixture comprising in combination a tubular split sleeve adapted to fit around the yoke bar and provided at its ends with pairs of lugs, reinforcing members engaging the inner walls of said lugs, bolts extending through the said pairs of lugs, a pole-ring provided with ears diverging from its periphery, said ears engaging said bolts loosely and free to move in all directions thereon between the lugs of each pair of lugs.

2. A clip for a neck yoke, comprising a tubular split clip adapted to fit around the yoke bar and provided at its ends with pairs of lugs, bolts extending through the said pairs of lugs, a pole ring connected with the said bolts intermediate the lugs of the said pairs of lugs, and inverted U-shaped strengthening members held on the said bolts intermediate the lugs and straddling the said ears.

3. A clip for a neck yoke, comprising a tubular split clip adapted to fit around the yoke bar and provided at its ends with pairs of lugs, bolts extending through the said pairs of lugs, a pole ring connected with the said bolts intermediate the lugs of the said pairs of lugs, and inverted U-shaped strengthening members held on the said bolts intermediate the lugs and straddling the said ears, the said lugs having flanges extending inward toward each other and engaging the edges of the said strengthening members to hold the latter against turning on the bolts.

WILLIAM JONES CASS.

Copies of this patent may be obtained for five cents each, by addressing the "Commissioner of Patents Washington, D. C."